US011933756B2

United States Patent
Fanselow et al.

(10) Patent No.: US 11,933,756 B2
(45) Date of Patent: Mar. 19, 2024

(54) ELECTROCHEMICAL SENSOR

(71) Applicant: Endress+Hauser Conducta GmbH+Co. KG, Gerlingen (DE)

(72) Inventors: Christian Fanselow, Geringswalde (DE); Stefan Paul, Dobeln (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 17/658,422

(22) Filed: Apr. 7, 2022

(65) Prior Publication Data

US 2022/0229011 A1 Jul. 21, 2022

Related U.S. Application Data

(63) Continuation of application No. 15/989,499, filed on May 25, 2018, now abandoned, which is a (Continued)

(30) Foreign Application Priority Data

Sep. 12, 2013 (DE) ...................... 10 2013 110 042.2

(51) Int. Cl.
*G01N 27/406* (2006.01)
*B32B 38/00* (2006.01)
(Continued)

(52) U.S. Cl.
CPC ..... *G01N 27/4062* (2013.01); *B32B 38/0036* (2013.01); *G01N 27/07* (2013.01);
(Continued)

(58) Field of Classification Search
CPC .. G01N 27/4062; G01N 27/403; G01N 27/07; G01N 17/02; G01N 27/00;
(Continued)

(56) References Cited

U.S. PATENT DOCUMENTS 4,338,174 A * 7/1982 Tamura ................ A61B 5/1491
374/208
2011/0259092 A1* 10/2011 Yu ......................... G01N 17/02
73/86

(Continued)

FOREIGN PATENT DOCUMENTS

DE 102011117115 A1 5/2013
DE 202012000569 U1 6/2013
(Continued)

OTHER PUBLICATIONS

Jeffrey Fergus "Sensors for online monitoring of Molten Metal Quality" TMS (The Minerals, Metals & Materials Society), 2011 (Year: 2011).*

*Primary Examiner* — Michael Y Sun
(74) *Attorney, Agent, or Firm* — Mark A. Logan; Endress+Hauser (USA) Holding, Inc.

(57) ABSTRACT

An electrochemical sensor comprising a probe immersible in a measured medium and having at least two electrodes of a first electrically conductive material and at least one probe body of a second, electrically non-conductive material. The electrodes are at least partially embedded in the probe body and insulated from one another by the probe body, wherein the at least two electrodes are embodied of at least one conductive material and the probe body of at least one electrically insulating ceramic, wherein the electrodes are embodied of thin, measuring active layers of a conductive material and sit in an end face of the probe body of a ceramic material, and wherein the electrodes are electrically contacted via connection elements extending through the probe body.

9 Claims, 2 Drawing Sheets

Related U.S. Application Data continuation of application No. 14/479,595, filed on Sep. 8, 2014, now abandoned.

(51) Int. Cl.
| | |
|---|---|
| *G01N 27/07* | (2006.01) |
| *G01N 27/403* | (2006.01) |
| *G01N 17/02* | (2006.01) |
| *G01N 27/00* | (2006.01) |
| *G01N 27/28* | (2006.01) |

(52) U.S. Cl.
CPC ........ *G01N 27/403* (2013.01); *B32B 2305/80* (2013.01); *B32B 2457/00* (2013.01); *G01N 17/02* (2013.01); *G01N 27/00* (2013.01); *G01N 27/283* (2013.01); *G01N 2203/0429* (2013.01)

(58) Field of Classification Search
CPC .......... G01N 27/283; G01N 2203/0429; B32B 38/0036; B32B 2457/00; B32B 2305/80
See application file for complete search history.

(56) References Cited

U.S. PATENT DOCUMENTS

2011/0309848 A1* 12/2011 Eberheim ............... B22F 3/225
                                                                                            264/618
2014/0061043 A1* 3/2014 Stock ................. G01N 27/4162
                                                                                           204/403.01

FOREIGN PATENT DOCUMENTS

| JP | H06300729 A | * 10/1994 |
|---|---|---|
| WO | 2010147873 A1 | 12/2010 |

* cited by examiner

ELECTROCHEMICAL SENSOR

CROSS-REFERENCE TO RELATED APPLICATIONS

The present application is a Continuation Applications related to and claims the priority benefit of U.S. Non-Provisional patent application Ser. No. 14/479,595, filed on Sep. 8, 2014, and of US. Non-Provisional patent application Ser. No. 15/989,499 filed May 25, 2018 and the entire contents of which are incorporated herein by reference.

TECHNICAL FIELD

The invention relates to an electrochemical sensor comprising a probe immersible in a measured medium and having at least two electrically conductive electrodes embedded in a ceramic probe body.

BACKGROUND

Electrochemical sensors are used in many fields, such as e.g. in clinical analysis or laboratory analysis, environmental protection, and process measurements technology. Electrochemical sensors work either according to a conductive, a potentiometric or an amperometric, measuring principle, such that the measured variable is ascertained in the medium via the electrodes.

Known from the state of the art, e.g. from EP 990 894 B1, are conductive conductivity sensors comprising at least two electrodes, which for measuring are immersed in the measured medium. For determining the electrolytic conductivity of the measured medium, the resistance or conductance of the electrode measuring path is determined in the measured medium. In the case of known cell constant, the conductivity of the measured medium can be ascertained therefrom.

Shown in German Patent DE 10 2006 024 905 A1 is an electrode arrangement of a conductive conductivity sensor, in the case of which an inner and an outer electrode are isolated and insulated from one another by a shaped seal and a seal support body. The shaped seal serves to prevent penetration of measured medium into an annular gap between the electrodes.

Such an electrode arrangement with additional seals is constructively relatively complex and disturbance susceptible, so that medium can penetrate into the gap between electrode and seal support body. The structural complexity is especially great in the case of conductivity sensors for application in foods technology or in the pharmaceutical industry. The sensors of process automation technology, which are applied in the foods and/or pharmacy industries, must fulfill very high requirements as regards hygiene. For example, the probes of such sensors, to the extent that they come in contact with the measured medium, must not have difficultly accessible gaps, in order that a cleaning and/or sterilizing of the total probe surface contacting the measured medium is possible. Conventional seals or a shaped seal can according to DE 10 2006 024 905 A1, indeed, basically fulfill this purpose. They lead, however, to a complex construction with corresponding assembly complexity. Furthermore, with age and wear, these seals can fail and then medium can get into the gap between electrodes and seal support body.

In general, the probe bodies of the probe of an electrochemical sensor are produced from a synthetic material by means of various manufacturing methods, such as e.g. injection molding, impression molding, and hot stamping, into which the metal electrodes are installed. A great disadvantage of combining synthetic material, such as a plastic, and the metal electrodes are their different coefficients of thermal expansion. In the case of high loadings due to high surrounding pressures, respectively temperature fluctuations, gaps form between the different materials of the probe body and the electrodes. This can lead to lack of sealing of the sensor element, whereby medium can penetrate into the sensor interior. Furthermore, germs can get into these gaps, whereby the sensor cannot be qualified for hygienic uses. Another undesired characteristic of synthetic materials is their poor long term durability, since they age. Aging as a result of aggressive media or repeated strong temperature changes increases the porosity of the applied synthetic materials. In this way, it is possible that liquid medium can diffuse through the synthetic material into the sensor interior.

Shown in Published International Application, WO 2010/072483 A1 is a conductive conductivity sensor having a probe immersible in a measured medium. The probe comprises at least two electrodes of a first electrically conductive material and at least one probe body of a second electrically non-conductive material. The electrodes are embedded in the probe body and insulated from one another by the probe body. Thus, the electrodes and the probe body are embodied as a sintered, composite piece. To accomplish this, the probe body and/or the electrodes are produced by means of a multicomponent injection molding process.

SUMMARY OF THE INVENTION

It is, consequently, an object of the invention to provide an electrochemical sensor having a probe immersible in a measured medium, which overcomes the disadvantages of the state of the art as regards sealing between the electrodes and the probe body, whereby the availability of the sensor is greatly increased, while manufacturing costs are reduced.

This object is achieved by an electrochemical sensor comprising a probe immersible in a measured medium and having at least two electrodes of a first electrically conductive material and at least one probe body of a second, electrically non-conductive material, wherein the electrodes are at least partially embedded in the probe body and insulated from one another by the probe body, wherein the at least two electrodes are embodied of at least one conductive material and the probe body of at least one electrically insulating ceramic, wherein the electrodes are embodied of thin, measuring active layers of a conductive material and sit in an end face of the probe body of a ceramic material, and the electrodes are electrically contacted via connection elements extending through the probe body.

The embodiment of the electrodes as thin material layers with connection elements extending through the probe body and their embedding in a ceramic probe body achieves a gap-free material transition and therewith also a gap-free sealing between the electrodes at least partially embedded in the probe body and the probe body.

In an advantageous embodiment, the measuring active layer of the conductive material of the electrodes has a coating thickness d of, for example, 10 µm-3 mm. This measuring active layer of the electrodes sits gap-freely in the ceramic material of the probe body, so that the end faces of the electrodes and the probe body form a plane. The coating thickness of the electrodes is, in such case, preferably in the range, 10 µm to 200 µm, whereby through minimal use of noble metals, such as e.g. platinum, titanium and stainless steel, also costs can be saved. These thin layers of concentrically arranged ring-electrodes are electrically contacted via corresponding connection elements.

In an additional embodiment, the conductive material comprises an electrically conductive ceramic, electrically conductive enamel or a metal, especially platinum, titanium or stainless steel.

In an advantageous embodiment, the ceramic material comprises at least a zirconium oxide ($ZrO_2$) ceramic, an aluminum oxide ($Al_2O_3$) ceramic, a chromium oxide ($Cr_2O_3$) ceramic, a titanium dioxide ($TiO_2$) ceramic, and/or a tialite ($Al_2TiO_5$) ceramic.

In an especially suitable further development, the electrodes comprise platinum and the probe body comprises a zirconium oxide ceramic stabilized by means of magnesium. The platinum of the electrodes and the zirconium oxide ceramic partially stabilized or stabilized with magnesium have approximately the same thermal coefficients of expansion, for example, zirconium oxide stabilized with magnesium $ZrO_2MgO$ at $9.3 \times 10^{-6}$ $K^{-1}$ and platinum Pt at $8.8 \times 10^{-6}$ $K^{-1}$. For equalizing the thermal coefficients of expansion of the ceramic material of the probe body and the coefficients of expansion of the metal material of the electrodes, stabilizing materials, such as, for example, magnesium, iridium and/or aluminum are added into the ceramic material of the probe body. These additions of stabilizing materials stabilize or at least partially stabilize the ceramic material, so that the thermal coefficients of expansion of the probe body and the electrodes are approximately equal and also other properties of the material of the probe body, such as, for example, greater chemical durability, better fracture behavior, etc., result. For this reason, the solid composite of electrodes and probe body remains stable over a large temperature range of, for instance, $-30°$ C. up to $300°$ C. This solid composite of the metal material of the electrodes and the ceramic material of the probe body results at least partially from intermolecular interactions or chemical bonds between regions of the metal material of the electrodes and regions of the ceramic material of the probe body. In this way, there results a high quality, material bonded connection between the electrodes and the probe body, which provides a gap-free seal. Because of the almost equal coefficients of expansion of the two materials, these bonding forces are also not overcome by otherwise arising mechanical stresses upon temperature changes, so that gap formation between the electrodes and the probe body is prevented.

In an additional advantageous embodiment, the probe body is connected with a process connection. By connecting the probe body to the process connection, an option is provided for applying the probe in process measurements technology directly and sealingly on the process container.

In an alternative embodiment, the process connection is embodied as one-piece with the probe body of the same electrically insulating ceramic. Ideally, the process connection is a component of the basic body of the probe, i.e. embodied as one-piece with the probe body, respectively embodied as a single molded part. This has the advantage that also the process connection is gap-free, due to the one-piece embodiment, so that the total conductivity sensor has no gaps. In a further development, for improving mechanical stability, respectively for securement of the sensor, metal parts or parts of synthetic material can be provided on the side of the process connection facing away from the process.

In a special further development, the process connection is connected at a joint mechanically and sealingly with the probe body by means of a joining means. Applied as joining means is an adhesive, which connects the metal process connection with the ceramic probe body and seals the joint, respectively the joining gap, gap-freely.

In an additional embodiment, the electrochemical sensor is embodied as a conductive conductivity sensor. Conductive conductivity sensors are applied in varied applications for measuring conductivity of a medium. The most known conductive conductivity sensors are the so-called two, or four, electrode sensors. Two electrode sensors have two electrodes in measurement operation immersed in the medium and supplied with an alternating voltage. A measuring electronics connected to the two electrodes measures an electrical impedance of the conductivity measurement cell, from which then, based on a cell constant determined earlier from the geometry and character of the measuring cell, a specific resistance, respectively a specific conductance, of the medium located in the measuring cell is ascertained. Four electrode sensors have four electrodes immersed in the medium during measurement operation, of which two are operated as so called electrical current electrodes and two as so called voltage electrodes. Applied between the two electrical current electrodes in measurement operation is an alternating voltage, so that an alternating electrical current flows through the medium. This electrical current creates between the voltage electrodes a potential difference, which is determined by a preferably currentless measurement. Also here, a measuring electronics connected to the electrical current, and voltage, electrodes determines from the introduced alternating electrical current and the measured potential difference the impedance of the conductivity measurement cell, from which then, based on a cell constant determined earlier from the geometry and character of the measuring cell, a specific resistance, respectively a specific conductance, of the medium located in the measuring cell is determined.

The object is achieved, furthermore, by a method for manufacturing a conductive conductivity sensor in one of the above described embodiments, comprising steps as follows:

producing in a first step a green body of the probe body from the electrically insulating ceramic, in a second step, pressing the electrodes with their connection elements into the green body or introducing the electrodes with their connection elements into corresponding cavities in the green body, sintering in a third step the green body with the introduced, respectively pressed in, electrodes and connection elements.

For manufacturing the ceramic green body, all known methods can be used. Examples include:

ceramic slip casting injection molding or temperature-inverse injection molding sheet casting extrusion assembly of plates chip removing methods, e.g. in a lathe or milling machine pressing (uniaxial pressing, cold isostatic pressing, hot isostatic pressing)

With this method, it is possible to produce the desired solid composite of the electrodes of metal and the ceramic probe body, at least in a portion of a material transition, especially by intermolecular interactions or chemical bonds, such as earlier described.

In a further embodiment of this method, the process connection is mechanically stably and sealingly connected with the probe body at a joint by means of a joining means, especially by means of an adhesive connection, and the region of the joint after the joining together and/or the end face of the probe body with the therein gap-freely embedded electrodes are/is ground or machined. Thus, the probe end face 7 and the joint 8 of the adhesive connection between the probe body 3 and the process connection 6 are ground, respectively machined, so that a planar, gap-free surface is obtained for the end face 7 and the joint 8.

BRIEF DESCRIPTION OF THE DRAWINGS

The invention will now be explained in greater detail based on the examples of embodiments shown in the drawing, the figures of which show as follows.

DETAILED DISCUSSION IN CONJUNCTION WITH THE DRAWINGS

Figure 1:
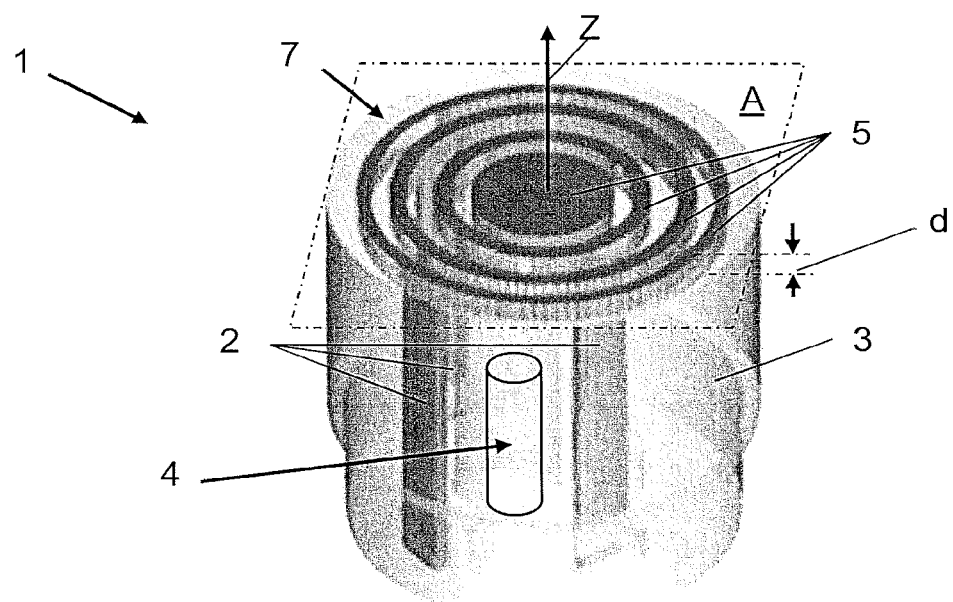
FIG. 1 is a probe of an electrochemical sensor, especially a conductivity sensor, according to a first embodiment of the invention.

FIG. 1 shows a probe 1 of the invention for an electrochemical sensor, especially a conductivity sensor, with a probe body 3 of an electrically non-conductive, ceramic material and, according to the invention, therein embedded electrodes 5 of a thin, electrically conductive material. The coating thickness of the material of the electrodes 5 of the invention, which are provided in FIG. 1 as concentric rings, respectively sleeves, sintered into the probe body 3, lies in a range of 10 micrometer to 3 millimeter, whereby material for the manufacture of the probe 1 and, thus, costs, are saved. The end faces of the electrodes 5 lie freely exposed on the end face 7 of the probe body 3 and in the case of a measuring of conductivity they are in contact with the measured medium. FIG. 1 shows a perspective view of the probe 1 and shows, concentrically arranged around the rotational symmetry axis Z, the ring elements of the electrodes 5, which in the case of a measuring of conductivity are immersed in the measured medium. Electrodes 5 are embodied as ring elements coaxially arranged around the shared rotational symmetry axis Z and are embedded in the sensor body 3 insulated from one another. Probe 1 is embodied as a measuring probe of a 4-electrode sensor. In the case of this type of sensor, in measurement operation, an alternating voltage is applied to the two electrodes 5 of the electrical current electrodes and the potential difference determined on the other two, remaining electrodes of the voltage electrodes. Using a measurement transmitter (not explicitly shown) connected with the electrodes 5, the impedance of the conductivity measurement cell formed by the probe 3 immersed in the measured medium is ascertained. Taking into consideration the cell constants, the specific resistance, respectively the specific conductivity, of the measured medium can be ascertained therefrom. The ascertained measured values can either be displayed by the measurement transmitter or output to a superordinated control system. A part the functions of the measurement transmitter can be executed by a measuring electronics accommodated in a separate housing outside of the measurement transmitter. This measuring electronics can, at least in part, be accommodated, for example, in a plug head connected with the probe 1, which plug head is available from the applicant under the mark, MEMOSENS®.

The electrodes 5 are platinum and the probe body 3 a zirconium oxide ceramic stabilized, respectively partially stabilized, by means of magnesium. The platinum of the electrodes 5 and the zirconium oxide ceramic of the probe body 3 stabilized with magnesium possess approximately the same thermal coefficients of expansion, for example, with magnesium stabilized zirconium oxide $ZrO_2MgO$ being at $9.3 \times 10^{-6}$ $K^{-1}$ (per degree Kelvin) and platinum Pt at $8.8 \times 10^{-6}$ $K^{-1}$. There are, however, other such material combinations for the electrodes 5 and the probe body 3, whose thermal coefficients of expansion differ only little from one another, i.e. preferably deviating from one another by only $1 \times 10^{-6}$ to $2 \times 10^{-6}$ $K^{-1}$. Thus, for example, in the case of platinum as material for the electrodes 5, which has a thermal coefficient of expansion of $8.9 \times 10^{-6}$ $K^{-1}$, such can be combined with an aluminum oxide ceramic with a coefficient of expansion of 6 to $8 \times 10^{-6}$ $K^{-1}$. In the case of titanium with a coefficient of expansion of $10.8 \times 10^{-6}$ $K^{-1}$ as electrode material, such can be used with, for example, zirconium oxide ceramic with a coefficient of expansion of 10 to $12 \times 10^{-6}$ $K^{-1}$ as material for the probe body 3. A zirconium oxide ceramic for the probe body 3 is likewise suitable for combination with stainless steel as material for electrodes 5, since stainless steel has a thermal coefficient of expansion of about $13 \times 10^{-6}$ $K^{-1}$.

Through the situating of metal in a ceramic shape, e.g. by sintering, the metal of the electrodes 5 is surrounded in a shape-interlocking manner by the ceramic material of the probe body 3 and there arises also, such as earlier described, a material bonding between the two materials. For situating the electrodes 5 in the probe body 3, the electrodes are seated in cavities provided in the probe body 3 or slightly pressed into the green body of the probe body 3. After insertion of the electrodes 5 into the ceramic green body of the probe body 3, the assembly is sintered by means of a predetermined temperature regimen.

The electrodes 5 can also be produced by deposition of the conductive material into corresponding cavities in the probe body 3. The following methods can be used for the deposition:

vapor deposition of metals
sputtering of metals
screen printing with metal pastes In supplementation, also the probe body 3 can be produced by the following deposition methods from a gas phase or liquid phase:

Chemical vapor deposition (CVD)—In such case, a plurality of gases react with one another at a certain pressure and high temperatures and deposit a ceramic material.

Physical vapor deposition (PVD)
Chemical vapor infiltration (CVI)

Since the coefficients of expansion of ceramics, such as e.g. zirconium oxide and metal, preferably platinum, are almost identical, gap formation can be minimized. Furthermore, such a ceramic is suited due to its poor electrical conductivity as a support material for electrical measurements between the electrodes 5. Furthermore, ceramics are very suitable support material due to their very good chemical durability. Ceramics have the property that they age very much slower than synthetic materials, which leads to a very much longer service life of the sensor. The surface roughness of the end faces 7 of the electrodes and/or of the probe body 3, as well as the joint 8 between probe body 3 and process connection 6, is further reduced by polishing processes after the manufacture, so that possibly arising gaps and openings on the outer surface of the ceramic probe body 3 are removed and, thus, the high hygienic requirements of the probe 1 can be durably fulfilled.

Used as electrically conductive material can also be an electrically conductive ceramic, respectively enamel, which is cast, injected, respectively introduced into the corresponding cavities in the green body of the probe body 3 and after introduction sintered together with the green body of the probe body 3. This embodiment has the advantage that the used materials and, thus, the coefficients of expansion are very similar.

Embedded in the probe body 3 and in the process connection 6 are the electrodes 5 of the probe 1, which are electrically contacted via connection elements 2, respectively connection lines. Provided for this, for example, in a region of the sensor body 3 and of the process connection 6 facing away from the process are connection elements 2, via which the electrodes 5 can be connected with a control or measuring electronics.

Used for measuring the current temperature of the medium can be, furthermore, a temperature sensor 4. Temperature sensor 4 is inserted via a cavity provided in the probe body 3 facing away from the medium, respectively held in place with a thermally conductive adhesive. By means of this temperature sensor 4, the current temperature of the medium on the electrodes 5 can be ascertained and, thus, a thermal correction of the conductivity measurement performed.

Figure 2:
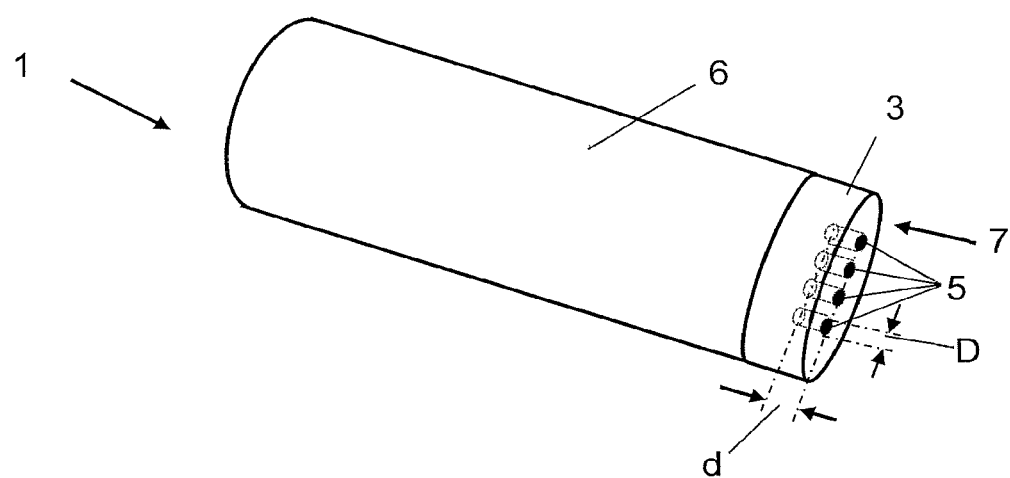
FIG. 2 is a probe of an electrochemical sensor, especially a conductivity sensor, according to a second embodiment of the invention.

Probe 1 shown in FIG. 2 forms the measuring probe of a so-called 4-electrode sensor immersible in a measured medium. Two electrodes 5, especially two electrodes 5 directly adjoining one another, are operated as so called electrical current electrodes. The two remaining electrodes 5 are operated as voltage electrodes. Applied between the two electrical current electrodes in measurement operation is an alternating voltage, in order to introduce an alternating electrical current into the measured medium. Measured between the voltage electrodes, especially using a currentless measuring, is the resulting potential difference. Using the introduced alternating electrical current and the measured potential difference, the impedance of the conductivity measurement cell formed through immersion of the probe 1 in a measured medium is calculated, and from the impedance while taking into consideration the cell constant, the specific resistance, respectively the conductivity, of the measured medium can be ascertained. Serving for control of the introduced alternating current for measuring the potential difference of the voltage electrodes and converting the measured values into a resistance, respectively conductance or a specific resistance, respectively specific conductivity of the measured medium is a measurement transmitter (not explicitly shown) connected with the probe 1. The measuring electronics can be a component of the measurement transmitter or at least partially accommodated in a separate module, for example, in a plug head connected with the probe 1. The ascertained measured values can either be displayed by the measurement transmitter or output to a superordinated control system.

As described in WO 2010/072483 A1, the probe 1 can also be produced in a single method step by means of a two component, injection molding method. In the case of this method, preferably an injection molding machine with two injection units is used. In the case of application of one injection unit for the electrode material and an additional injection unit for the material of the sensor body, the two injection units are preferably controlled independently of one another, since, in this way, a larger variety of electrode geometries can be produced. Two component injection molding is a technology established especially for the manufacture of components of different synthetic materials. The injection molding of metals or ceramics, for example, by means of metal powder injection molding (MIM—Metal Injection Molding) or ceramic power injection molding (CIM—Ceramic Injection Molding), is a known and established manufacturing method for technically demanding and complex molded parts. Also, multicomponent injection molding of metals and/or ceramics as individual components is, in principle, known, however, previously not usual in the manufacturing of composites of metal and ceramic.

Figure 3:
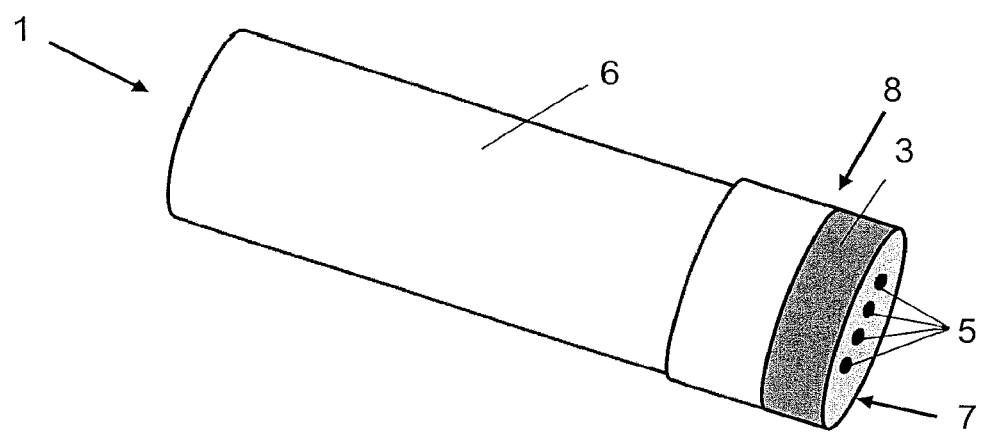
FIG. 3 is a probe of an electrochemical sensor, especially a conductivity sensor, according to the second embodiment of the invention of FIG. 2 with a diameter expansion of the process connection at the joint.

In FIGS. 2 and 3 of the probe 1, the probe body 3 is joined with a process connection 6. For this, the probe body 3 is connected mechanically stably and sealingly with the process connection 6, for example, by means of an adhesive. The joint 8 between the sensor body 3 and the process connection 6 can be further worked by means of machining, grinding, and/or polishing. In this way, also adhesive residues are removed. The diameter of the process connection 6 and of the probe body 3 is enlarged at least in this region of the subsequent working of the joint 8. In order that the adhesive gap be as small as possible, thus, as hygienic as possible, the lower end of the process connection 6 as well as the ceramic sensor body 3 are provided with a diameter larger than desired in the target application. Through subsequent grinding or machining of the joint 8 of the connection between sensor body 3 and process connection 6, a region with very much smaller surface roughness is produced. Thus, also highest hygienic requirements can be fulfilled.

The measuring active layer of the conductive material of the electrodes 5 is embodied in a coating thickness d of, for example, 10 μm-3 mm and so seated in the probe body 3 that its end faces 7 lie in a plane A. The thickness d, respectively height, of the electrodes 5 as well as their diameter D amounts in the embodiment of a four electrode measuring probe 1 of FIG. 2 or FIG. 3 to preferably 1 to 2 millimeter.

What is claimed is:

1. A method of manufacturing an electrochemical probe, comprising:
   producing a green probe body of an electrically insulating ceramic, the probe body having:
      a first end and a second end;
      an axis of symmetry extending from the first end to the second end;
      at least two cavities disposed in an end face of the second end;
      at least two through-holes extending through the probe body from the first end to the second end and communicating with a respective cavity at the second end; and
      a cavity accessible from the first end of the probe body;
   providing at least two electrodes embodied of an electrically conducting material;
   providing at least two connection elements embodied of the electrically conducting material, wherein each connection element is embodied to extend from the first end to the second end of the probe body through one of the at least two through-holes, and each connection element is electrically connected with one of the at least two electrodes;
   pressing each electrode with its connected connection element into the probe body by pressing the electrode into one of the at least two cavities and pressing the connection element into the corresponding through-hole such that the connection element extends through the probe body to the first end and an outer surface of the electrode is flush with the end face of the second end of the probe body;

sintering together the green probe body, the at least two electrodes, and the at least two connection elements to produce a sintered probe body, wherein the sintering produces a material bonding between the electrodes and the probe body making a gap-free material transition between each electrode and the probe body;

inserting a temperature sensor into the cavity of the sintered probe body; and joining the temperature sensor to the sintered probe body in the cavity with a thermally conductive adhesive.

2. The method of claim 1, wherein the electrically insulating ceramic is one of: a zirconium oxide ($ZrO_2$) ceramic, an aluminum oxide ($Al_2O_3$) ceramic, a chromium oxide ($Cr_2O_3$) ceramic, a titanium dioxide ($TiO_2$) ceramic, and a tialite ($Al_2TiO_5$) ceramic.

3. The method of claim 1, wherein the electrically conductive material is one of: electrically conductive ceramic, electrically conductive enamel, platinum, titanium, and stainless steel.

4. The method of claim 1, wherein the electrically conductive material is platinum and the electrically insulating ceramic is zirconium oxide ceramic stabilized with magnesium ($ZrO_2MgO$).

5. The method of claim 1, further comprising:

joining a metal process connection to the sintered probe body with an adhesive.

6. The method of claim 1, further comprising:

machining and polishing the second end face of the sintered probe body and the at least two electrodes to remove any surface roughness.

7. The method of claim 1, wherein the green probe body further has process connection embodied of the same electrically insulating ceramic as the probe body such that the probe body and the process connection form a single molded part.

8. A method of manufacturing an electrochemical probe, comprising:

producing a green probe body of an electrically insulating ceramic, the probe body having:
    a first end and a second end;
    an axis of symmetry extending from the first end to the second end;
    at least two cavities disposed in an end face of the second end;
    at least two through-holes extending through the probe body from the first end to the second end and communicating with a respective cavity at the second end; and
    a cavity accessible from the first end of the probe body;

providing at least two connection elements embodied of an electrically conducting material, wherein each connection element is embodied to extend from the first end to the second end of the probe body through one of the at least two through-holes;

pressing each connection element into the probe body;

forming at least two electrodes, wherein each electrode is formed by deposition of a conductive metal into one of the at least two cavities, wherein each electrode makes electrical contact with a respective connection element, wherein each electrode is formed to fill a corresponding cavity, and wherein each electrode has an outer surface flush with the end face of the second end of the probe body;

sintering together the green probe body, the at least two electrodes, and the at least two connection elements to produce a sintered probe body, wherein the sintering produces a material bonding between the electrodes and the probe body making a gap-free material transition between each electrode and the probe body;

inserting a temperature sensor into the cavity of the sintered probe body; and joining the temperature sensor to the sintered probe body in the cavity with a thermally conductive adhesive.

9. The method of claim 8, wherein the deposition of the conductive metal is formed by one of: a vapor deposition of metals, a sputtering of metals, and a screen printing with metal pastes.

* * * * *